Patented Jan. 5, 1954

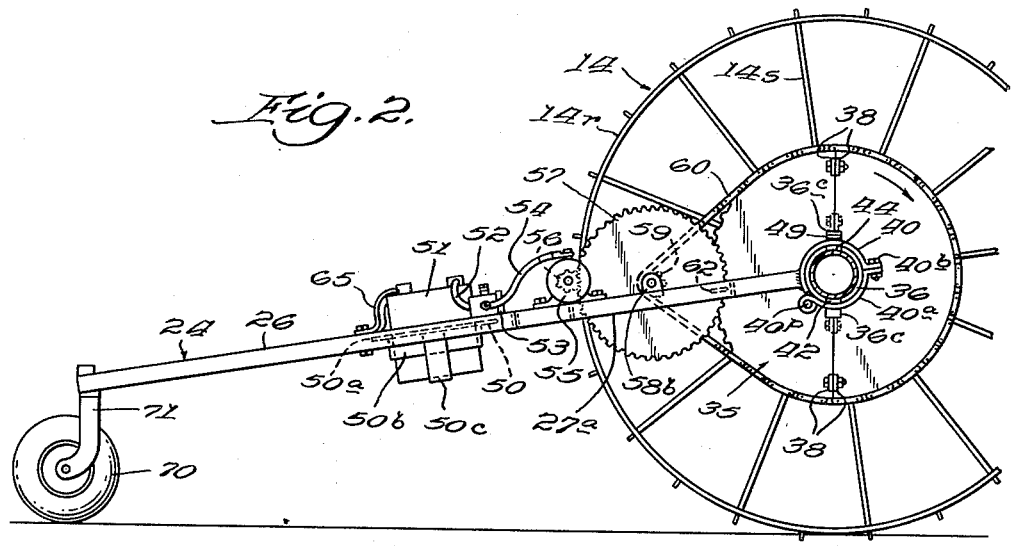
Fig. 2.
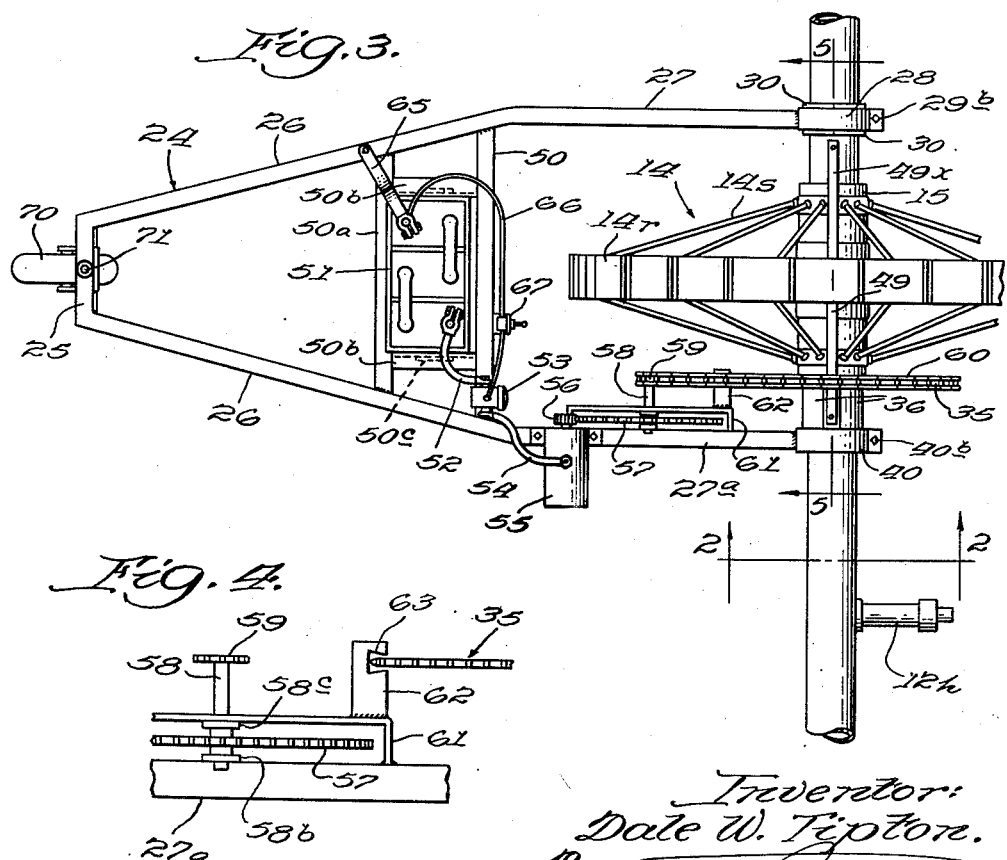
Fig. 3.
Fig. 4.
Inventor:
Dale W. Tipton.

2,665,169

UNITED STATES PATENT OFFICE 2,665,169

MECHANICAL MEANS FOR PROPELLING FIELD SPRINKLING APPARATUS

Dale W. Tipton, Lawndale, Calif.

Application January 16, 1951, Serial No. 206,151

11 Claims. (Cl. 299—47)

This invention relates to a mechanical means for propelling field sprinkling apparatus.

The present invention is designed to be used in conjunction with a conventional wheel-supported irrigating conduit consisting of universally joined sections of pipe extending across a field.

Accordingly, the present invention more particularly pertains to improvements in propelling means for an irrigating apparatus wherein a plurality of pipe sections are arranged in a communicating end to end relation and are provided at spaced intervals with supporting wheels, the adjacent sections being separably coupled together by a water tight coupling means which are sufficiently flexible to permit adjacent, coupled together pipe sections to assume different angular positions relatively to each other, as required when the pipe assembly is rolled over uneven ground, the present invention substituting mechanical propelling means for the manual propelling means heretofore used.

This invention does not pertain broadly to sprinkling apparatus, but relates only to mechanical means associated therewith to advance said apparatus in different stages over a stretch of ground so that all portions thereof may be properly sprinkled.

An object of the invention is to provide an efficient mechanical means to advance across a field being irrigated a string of irrigating pipe consisting, as already stated, of communicating sections that may be deflected in relation to each other so as to be moved over uneven ground.

A more specific object is to provide a reversible means to advance the irrigating pipe, said means being detachably connected with the string of pipe, so that, after it has propelled the latter across a field, while stationed at one side of the pipe, it may be detached from the pipe and then reattached thereto, after stationing at the opposite side thereof, to propel the pipe back across the field thus avoiding the necessity of turning the pipe end for end, when it becomes necessary to re-irrigate the same area.

Another object is to provide, for a sprinkling apparatus of the above stated kind, an improved, diametrically divided sprocket wheel having a hub portion operatively connected with the conventional part of the apparatus to rotate the pipe, the bearing structure being simplified by reason of a portion of said hub structure forming one of the two required bearing elements.

A still further specific object is to provide for more efficiently rotating a string of irrigating pipe sections by applying the mechanically furnished torsional force to the adjacent end portions of two of the pipe sections, thus producing a more efficient pipe rotating means than would result, if the torsion were applied to the midlength portion of only a single pipe section.

Yet another object is to provide a new and improved mode of assembling the wheel supports and driving means of a sectional pipe irrigating apparatus of the above stated kind, so that a more stable and operatively dependable structure will result.

Other objects, advantages and features of invention will hereinafter appear.

Referring to the accompanying drawings, which illustrate a preferred, reduced to practice embodiment of the invention, Fig. 1 is a fragmentary plan view showing one end portion of the apparatus connected with a conventional supply run of irrigating pipe. This view is on a smaller scale than the remaining views.

Fig. 2 is a fragmentary side elevation of the structure shown in Fig. 3 the pipe being sectioned on line 2—2 of the latter view.

Fig. 3 is a plan view of the structure shown in Fig. 2.

Fig. 4 is an enlarged, fragmentary reproduction of a portion of Fig. 3, illustrative of a part of the driving mechanism and of a centering device for the chain drive mechanism.

Fig. 5 is a fragmentary vertical section, on a larger scale than Fig. 3, the plane of section being indicated by line 5—5 on the latter view.

Fig. 6 is a fragmentary perspective view, on the scale of Fig. 5, illustrating a hub portion of the sprocket wheel that rotates the irrigating pipe.

Fig. 7 is a fragmentary sectional view on line 7—7 of Fig. 5.

Figure 1:
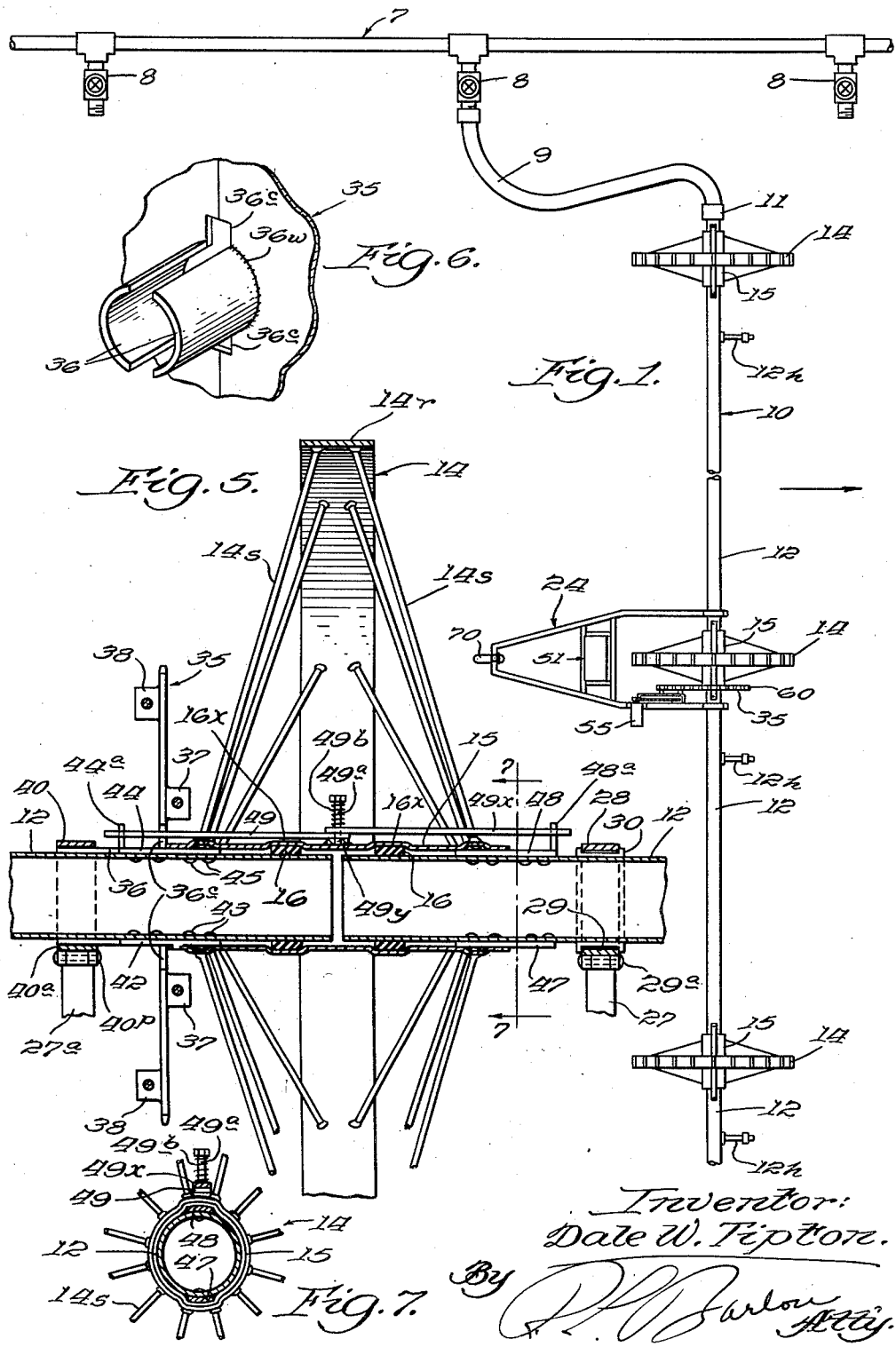

Referring in detail to the drawings, 7 designates a run of supply pipe laid along one side of a field to be irrigated and connected with a suitable source of water supply under pressure. Said pipe 7 is provided at suitable intervals along its length, preferably every sixty feet, with valve controlled outlets 8, individually connectible with one end of a flexible hose 9 whose opposite end is shown connected to one end of the delivery pipe 10 by a coupling 11.

Said delivery pipe 10 is composed of a plurality of slightly separated pipe sections 12 arranged in an approximately axially alined communicating relation to each other and supported by ground wheels 14 which may be provided with peripheral traction lugs as shown. Said ground wheels are attached to the pipe 10 where its adjacent sections 12 meet, as shown in Fig. 5, where a fluid tight sleeve 15 is shown concentrically surrounding and slightly spaced radially away from slightly spaced apart pipe end portions. Said sleeve grips elastic liquid seal rings 16 between itself and the adjacent pipe sections, said sleeve having circumferentially outsprung zones 16x to accommodate said rings 16. As already stated, this part of the structure, separately considered, forms no part of the present invention and therefore need not be described in further detail, though it should be pointed out that it prevents leakage and at the same time allows a slight angular change of adjacent pipe sections in relation to each other, thus adapting the apparatus for use upon fields having variously inclined surface portions.

The ground wheels 14 are shown having two series of spokes 14s, said two series having their inner ends spaced apart lengthwise of the hub sleeve 15 to which they are attached, their outer ends being connected to the wheel rim 14r.

By the present invention a mechanical means is provided to advance the wheel supported pipe from a sprinkled to an unsprinkled area whenever that is required. Said mechanical means comprises a wheelbarrow-like frame 24 reversely positionable in relation to the pipe, having at its rear end a crossbar 25 from which extend forwardly twin diverging side bars 26 which are obtusely bent in such a manner as to provide throughout the front end portion of said frame parallel side bars 27 and 27a.

The one of said parallel arms designated 27 carries at its front end an upper stationary arcuated embracing member 28 having a lower segment 29 swingably attached to it by means of a pin 29a, said segment 29 normally being held in its inswung position by a bolt 29b shown in Fig. 3. Within said segments 28 and 29 is a diametrically split bushing 30 having an outwardly directed flange around each end, as shown in Fig. 5, these flanges being sufficiently wide safely to allow the desired very loose fit of said members 28 and 29 around said bushing, allowing them as much as one-fourth inch play.

At the left side of the wheel 14 as viewed in Fig. 5, a two part driving sprocket wheel 35 is concentrically secured to the pipe section 12 at that side of the structure. Said sprocket wheel consists of a disk divided into two semicircular segments each of which carries a segmental hub sleeve 36, two inner ears 37, and two outer ears 38. When the two halves of said sprocket wheel are assembled the aforesaid ears of each half will abut those of the other half and will be bolted to each other. Also the half sleeves 36 will abut opposite sides of the pipe 12, being in a spaced apart relation as shown in Fig. 6.

The aforesaid half sleeves 36 are sufficiently long to afford a bearing for segmental members 40, 40a carried by the front end of the frame arm 27a, said members 40, 40a, respectively, being constructed like the aforesaid segmental members 28 and 29 carried by the frame arm 27 and normally being bolted together at 40b, the lower segment 40a being attached by a pin 40p.

As more clearly shown in Fig. 6, the assembled sprocket wheel 35 is provided above and below the sleeve segments 36 with cut-outs 36c to accommodate parts presently to be described. Said sleeve segments are shown welded to the body portion of the sprocket wheel halves by welds 36w.

As shown in the left hand portion of Fig. 5, a stiff metal spacing strap 42 is fitted into the space between the lower edges of the aforesaid segmental sleeve structure 36, this strap being secured to the pipe section 12 by means of rivets 43 the outer heads of which are countersunk into said strap. Also, diametrically opposite to said strap 42, between the upper edges of said segmental sleeve, is a metal spacing strap 44 secured by rivets 45 applied in the same manner as the aforesaid rivets 43. Said strap 44 is provided near its outer end portion with a pin 44a extending radially outward in relation to the pipe 12.

At that side of the wheel 14 which is opposite to the aforesaid spacing straps 42 and 44 are corresponding spacing straps 47 and 48 which are riveted in place in the same manner as said straps 42 and 44. All these spacing straps are fitted in between the sleeve hub 15 of the wheel 14 and, though they stabilize the structure adjacent to them, nevertheless allow a limited angular relative movement of the adjacent pipe sections, adapting the apparatus for use on fields different parts of which slope differently.

Said spacing straps cooperate with the edge portions of the hub segments at each side of them to transfer torsional force from the said sprocket wheel 35 to the pipe sections 12, whereby to advance the structure in opposite directions across the field, as will hereinafter be more fully described.

The spacing strap 48 carries a pin 48a like the aforementioned pin 44a of strap 44. With these two pins cooperate the apertured outer end portions of tie bars 49 and 49x. At their inner, overlapping ends said tie bars rest upon a boss 49y riveted to the sleeve 15 from which upstands a nut-carrying pin 49a that extends through both of said bars. A wire compression spring 49b surrounds said pin and normally holds down the apertured outer end portions of said bars so that they may readily be latched onto and unlatched from the pins 44a and 48a, and when in latched position prevent adjacent pipe sections 12 from being farther separated.

The aforementioned wheelbarrow-like frame 24 constitutes a chassis which is made of metal and is furnished with angle iron cross bars 50, 50a and angle iron bridge bars 50b, 50b which cooperate with a metal strap 50c to carry a conventional 6 volt storage battery 51. Said battery is furnished with a conductor cord 52 that conveys current therefrom through a solenoid switch 53, whence the current is conducted by a cord 54 to a (usually half horsepower) motor 55 mounted upon the inner end portion of the frame arm 27a. Said motor, in turn, operates pinion gear 56 in mesh with a reduction gear 57, the shaft 58 of which carries a pinion gear 59 over which passes a sprocket chain 60 that drives the aforesaid sprocket gear 35.

A broadly U-shaped mounting bar 61 is carried by the frame arm 27a and a centering arm 62 extending horizontally from said mounting bar is provided with a deep notch 63 which straddles the peripheral portion of the sprocket wheel 35 and causes the chassis 24 and the frame structure which carries the irrigating pipe to maintain alinement with said sprocket wheel, so that the chain does not climb off from said wheel when the apparatus travels over uneven ground.

Said mounting bar 61 has its end portions welded to the side piece 27a of the frame 24 and cooperates with said side piece to support bearing means 58b and 58c for the aforesaid shaft 58.

Battery 51 is shown having one of its poles grounded to the chassis bar 26 by means of a conductor strap 65, a sheathed wire 66 electrically connecting said pole, through a toggle switch 67 to the solenoid switch 53.

The rear end portion of the frame 24 is supported by a castor wheel 70 furnished with a bifurcated bearing stem 71 the upper part of which extends turnably through the already mentioned rear crosspiece 25.

The frame structure 24 is manually portable and constitutes the aforesaid chassis of a vehicle means upon which is mounted the motor 55, its battery 51 and the gearing which operates sprocket wheel 35.

The apparatus is adapted to advance across a field at a speed up to five miles an hour, an aluminum sprinkling pipe, three to five inches in diameter and as much as a quarter of a mile in length, only a single motor carrying, wheel supported frame being required in such cases. The sprinkling pipe may be allowed to remain in one place for six or eight hours or until the strip of the field being sprinkled thereby has been thoroughly irrigated. Then the operator will close the valve of the particular fixture 8 to which the hose 9 is attached and will thereupon detach said hose from said fixture and close switch 67, thus starting the motor 55, which through the aforesaid gearing and sprocket wheel driven thereby, will start rotating the pipe sections 10 together with the supporting wheels 14, with the result that the wheel supported pipe structure will advance across the field until, after the apparatus has advanced to a new area to be sprinkled, the operator opens the aforesaid switch 67, causing the motor to stop. Thereupon the hose 9 will be connected with the next valve controlled outlet 8 and the valve thereof will be opened, causing sprinkling to be resumed.

After an entire field has been sprinkled, and it is desired to cause the apparatus to move back over the field, this can be done by loosening the bolts 29b and 49b thereby permitting the pivoted segments 49a and 29 to swing about their pivot pins 40p and 29a whereby the frame arms 27 and 27a may be disconnected from the sectional pipe 10 and from the hub of the sprocket wheel 35 and, after tripping the conventional guide chain connector, turning the frame 24 around to the opposite side of the pipe and thereupon re-connecting the driving means with the sprocket wheel 35, after the latter has been transferred to the opposite side of the ground wheel 14, the apparatus is in readiness for propulsion in the opposite direction back across the field.

It is to be observed that, while the two halves of the diametrically divided sprocket wheel 35 may be constructed for bolting together under sufficient pressure to cause them firmly to grip the pipe 12 so as to turn the latter in a positive manner; yet this is not necessary, because the straps 42 and 44 (which are riveted to the pipe) interlock with the material at each side of the cut-out portions of said sprocket wheel hub, thus making a positive drive. In attaching the mechanical driving means to the string of irrigating pipe in the above stated manner, a new and advantageous mode of assembly is involved, which is an important feature of the invention.

Owing to the fact that the considerable weight of the water tends to make the pipe sag between wheel supported points, the arms of the chassis 24 are placed astride the adjacent wheel 14 with an arm at each side of a pipe joint, so as not to add to the weight of the midlength portion of any pipe section. This arrangement avoids the necessity of using heavier pipe sections where the chassis is supported to compensate for the weight of the latter. Also, thus avoiding excessive sagging of the pipe keeps the conventional sprinkling heads 12h carried thereby, at a more uniform height above the ground so that they sprinkle the surface thereof in a more uniform manner.

Noting a few additional details of the operation, when the motor is put into operation the primary driving pinion 56 will rotate in an anticlockwise direction thus turning the gear 57 in a clockwise direction, which, in turn, through shaft 53 and pinion gear 59 will operate chain 60 to turn the sprocket wheel 35 in the clockwise direction, together with the series of pipe sections 12 and of ground wheels rotatively fixed to them.

It will be seen that, by the power transmitting means shown the motor is geared down to such an extent that even though it be of a relatively low horsepower (often one-half horsepower), it will apply to the string of pipe powerful torsion, so that the ground wheels will climb up and over any inclined ground surfaces likely to be encountered in a field under cultivation.

I claim:

1. Mechanical means for advancing a string of universally connected irrigating pipe sections supported by ground wheels across a field comprising a chassis provided with longitudinally spaced apart bearing arms carrying means detachably encircling said irrigating pipe sections at points located adjacent each side of a selected wheel, and driving means carried by said chassis and operatively connected with mechanism carried by said irrigating pipe sections to provide a torsional force rotating the latter together with the ground wheels supporting the same.

2. The subject matter of claim 1 and said mechanism including shouldered means, part of said shouldered means providing a bearing bushing for the aforesaid encircling means carried by one of said arms.

3. In an apparatus for advancing across a field a string of irrigation pipe supported upon ground wheels at spaced apart intervals therealong, said wheels having hub portions surrounding said pipe in a rotationally fixed relation thereto, a diametrically divided sprocket wheel concentric to said pipe in a rotationally fixed relation thereto, said sprocket wheel being located adjacent to one of said ground wheels and having an extended hub portion directed away from said one wheel, a frame, a motor mounted thereon and operatively connected with said sprocket wheel, said frame having horizontally spaced apart front end portions including between them said one wheel together with said sprocket wheel, bearing means carried by said frame to support one of said end portions thereof upon said extended hub portion of said sprocket wheel, and bearing means carried by said frame to support the other of said end portions thereof upon the pipe adjacent to the opposite side of said one wheel, said two bearing means being detachable and interchangeable so as to be positioned at either side of said one wheel, and said divided sprocket wheel likewise being applicable to the pipe at either side of said one wheel; thus enabling the operator to station said frame at either of opposite sides of said string of pipe to reverse the direction of its propulsion across a field.

4. The subject matter of claim 3 and said extended hub portion of said sprocket forming a bushing for one of said two bearing means, and a two-part detachable bushing which is applicable to said pipe at either side of said one wheel, the aforesaid bearing means carried by each front end portion of said frame being connectible with either of the aforesaid two bushings.

5. The subject matter of claim 3 and said sprocket wheel having a body portion which consists of a circular vertical plate, said plate having through it an opening adjacent to the hub of the wheel, to receive a tie bar extending through said opening and tying together two pipe sections adjacent to said one wheel.

6. In an apparatus for advancing across a field a string of irrigating pipe supported upon ground wheels rotationally connected therewith at spaced apart intervals therealong, a diametrically divided sprocket wheel including a hub portion consisting of two diametrically separated slightly spaced apart segments embracing said pipe between them, said sprocket wheel being located adjacent to one of said ground wheels and having its extended hub portion directed away from said one wheel, means in a rotationally fixed relation to said pipe occupying the space between said hub segments so that rotating of said sprocket wheel will rotate said string of pipe, and mechanical means operatively connected with said sprocket wheel to rotate the latter together with said pipe.

7. The subject matter of claim 6 and said mechanical means comprising a frame, said frame having horizontally spaced apart front end portions including between them said one wheel together with said sprocket wheel, and a caster wheel supporting the rear end portion of said frame.

8. In an apparatus for advancing across a field a string of axially alined irrigating pipe sections supported upon ground wheels connected thereto so as to rotate therewith, the ends of adjacent sections being slightly spaced apart and being surrounded with conventional flexible liquid sealing means; mechanical means attached to said string of pipe sections to rotate it, and a frame whereon said mechanical means is mounted, said frame having an end portion supported loosely upon said string of pipe and a ground wheel supported opposite end portion, said frame being manually portable and bearing means wherein said string of pipe is turnable in relation to that end portion of said frame which is supported by the pipe, said bearing means comprising a plurality of bearing structures each of which consists of a stationary segment and a segment swingable connected thereto thus rendering it detachable from and re-attachable to the pipe, enabling the operator to station said frame at either side of the pipe in an attached relation thereto to reverse the direction of the propulsion of the pipe across a field.

9. In an apparatus for advancing across a field a string of irrigating pipe supported upon ground wheels rotationally connected therewith at spaced apart intervals therealong, a sprocket wheel having a hub portion embracing said pipe, means operatively connecting said pipe and hub so that rotating said sprocket wheel will rotate said string of pipe, and mechanical means operatively connected with said sprocket wheel to rotate the latter together with said pipe, said mechanical means comprising a frame having spaced apart front end portions loosely supported upon said string of pipe and including between them one of said ground wheels together with said sprocket wheel, and a caster wheel supporting the opposite end portion of said frame.

10. In an apparatus for advancing across a field a string of flexibly joined together irrigating pipe sections supported by ground wheels having hubs comprising sleeves spanning the flexible joints of said pipe sections, a sprocket wheel concentric to said pipe sections in a rotationally fixed relation thereto, said sprocket wheel being located adjacent to one of said ground wheels, a frame, and a motor mounted thereon and operatively connected with said sprocket wheel, said frame having horizontally spaced apart front end portions including between them said one wheel together with said sprocket wheel.

11. In an apparatus for advancing across a field a string of alined irrigating pipe sections with adjacent end portions flexibly joined and supported by ground wheels having hubs comprising sleeves surrounding adjacent pipe end portions, sealing means within said sleeves making a liquid tight seal between adjacent pipe end portions, means connecting said wheels with said adjacent pipe end portions, to apply a turning force to both of the pipe end portions from said wheels when the latter are rotated, a vehicle chassis in a trailing relation to said string of pipe, motor driven mechanical means mounted on said chassis and operatively connected with one of said wheels to rotate the latter, said chassis having horizontally spaced apart front end portions embracing adjacent pipe end sections at opposite sides of said wheel, and means detachably connecting said front end portions with said pipe end sections to selectively position said chassis at either of opposite sides of the string of pipe.

DALE W. TIPTON.

References Cited in the file of this patent

UNITED STATES PATENTS

| Number | Name | Date |
|---|---|---|
| 730,902 | George | June 16, 1903 |
| 1,085,609 | Heath | Feb. 3, 1914 |
| 1,966,783 | Balaam | July 17, 1934 |
| 2,101,172 | Gegenheimer | Dec. 7, 1937 |
| 2,329,159 | Gwaltney | Sept. 7, 1943 |
| 2,516,711 | Mansur | July 25, 1950 |
| 2,582,416 | Cornelius | Jan. 15, 1952 |

FOREIGN PATENTS

| Number | Country | Date |
|---|---|---|
| 414,551 | Germany | June 9, 1925 |